United States Patent [19]

Hurd et al.

[11] 4,143,259

[45] Mar. 6, 1979

[54] METHOD OF FABRICATING STAINLESS STEEL ALUMINUM ROTOR

[75] Inventors: Charles D. Hurd, Boulder; Robert P. Loomis, Longmont, both of Colo.

[73] Assignee: International Business Machines Corporation, Armonk, N.Y.

[21] Appl. No.: 805,948

[22] Filed: Jun. 13, 1977

Related U.S. Application Data

[62] Division of Ser. No. 617,872, Sep. 29, 1975, Pat. No. 4,068,270.

[51] Int. Cl.² .............................................. B23K 9/00
[52] U.S. Cl. ..................... 219/121 EM; 219/121 LM
[58] Field of Search ................ 219/121 EM, 118, 137, 219/121 LM

[56] References Cited

U.S. PATENT DOCUMENTS

| 2,985,747 | 5/1961 | Kutchera | 219/118 X |
| 3,458,683 | 7/1969 | Canonico et al. | 219/121 EM |
| 3,975,612 | 8/1976 | Nakazaki et al. | 219/118 X |

*Primary Examiner*—J. V. Truhe
*Assistant Examiner*—Fred E. Bell
*Attorney, Agent, or Firm*—Joscelyn G. Cockburn

[57] ABSTRACT

A rotor which carries a transducer for a rotating-head device is fabricated from a substantially circular aluminum support means with a stretched length of stainless steel foil encircling its perimeter. The rotor is bonded together by anchoring stainless steel pins into the periphery of said aluminum supporting means and electron beam welding the stainless steel foil onto said stainless steel pins.

11 Claims, 6 Drawing Figures

METHOD OF FABRICATING STAINLESS STEEL ALUMINUM ROTOR

This is a division of application Ser. No. 617,872 filed Sept. 29, 1975 now U.S. Pat. No. 4,068,270.

BACKGROUND OF THE INVENTION

1. Field of the Invention

The present invention relates to a method of bonding metallurgical incompatible metals by electron beam welding to form an article. More specifically, the invention relates to the fabrication of a rotor for a rotating head device from aluminum and stainless steel foil.

2. Prior Art

The following U.S. Patents are representative of the prior art: U.S. Pat. Nos. 3,840,894; 3,566,008 and 3,458,683.

Also an article entitled "Air Bearing Construction" in the IBM Technical Disclosure Bulletin, Volume 16, No. 12, May 1974, page 3847 is representative of the prior art.

Rotating head magnetic devices are well known in the prior art. In the so-called helically scanned devices, a length of magnetic media is helically wrapped around a mandrel which is split and is separated to accommodate a rotating wheel, sometimes called a rotor, which carries a magnetic transducer. Generally, the mandrel comprises two separate cylindrical halves which abut the rotating wheel. The rotating wheel and the cylindrical halves have substantially identical raduis and the rotating wheel carries the magnetic head. In many applications, the magnetic media makes contact with both the mandrel surface and the rotating wheel carrying the magnetic transducer.

The ideal condition is for the magnetic media to fly relative to the rotating wheel. However, due to imperfections in the media surface, this ideal condition is not reached. That is, at some point in time the magnetic media will be in contact with the rotor. With this realization, in order to extend the wear life of the rotor it is necessary that the surface or skin of the rotor which comes in contact (i.e., the surface which interfaces) with the magnetic media be manufactured from a relatively hard material or metal. For example, stainless steel is an acceptable metal.

Due to the fact that the rotor has to be accelerated at relatively high speed, for example, 5,000 inches per second, and then stopped within a relatively short time, the rotor support to which the stainless steel foil or skin is affixed has to be manufactured from a relatively light weight material, for example, aluminum.

It is well known in the prior art that aluminum and stainless steel are dissimilar metals; i.e., the metals are metallurgically incompatible. Being dissimilar or incompatible, it is extremely difficult if not impossible to bond these metals together to form a conventional rotor which will withstand wide temperature variation, for example, within the range of from −40° F. to 350° F.

One method used in the prior art to bond dissimilar metals (for example, a rotor having an aluminum body with a stainless steel skin or foil attached thereto) is to epoxy said metals to form a unified structure. Generally, a glue line (i.e., the interface between the two dissimilar metals) is established by placing a layer of epoxy or adhesive on one surface of the stainless steel foil and placing another layer of adhesive on the outside surface of the rotor body. The epoxy surfaces of the stainless steel foil and rotor body are then brought into contact and a clamp is used for applying pressure. The structure is then baked to a temperature of approximately 350° F. The structure is then cooled to room temperature and the clamp is removed. This completes the process and the article (rotor) is now ready for use in a rotating head device. A more detailed description of the process is disclosed in the above referenced IBM Technical Disclosure Bulletin.

The article and method as described above are plagued with several problems which render the article unsuitable for its intended purpose or use.

Probably the most devastating problem is that the glue line (i.e., the epoxy interface between the stainless steel foil and the aluminum rotor body) rupture, during cooling, thereby separating the stainless steel foil from the aluminum rotor. The defect stems from the fact that stainless steel and aluminum have different coefficients of expansion. Due to this difference, as the rotor structure cools, the stainless steel and the aluminum shrink at different rates. This tends to set up shear forces within the glue line which in time separates the stainless steel from the aluminum thereby rendering the structure useless.

Another problem which plagues the prior art is that of concentricity. As was mentioned previously, in bonding the stainless steel foil to the aluminum rotor body, a layer of epoxy is used as the bonding substance. Once the structure (i.e., the rotor) is cured and cooled, it is machined to have a specified surface contour. After machining, the surface contour must be concentric with a reference point. If this concentricity is not met, then the rotor is rejected.

In order to maintain acceptable bonding strength between the stainless steel foil and the aluminum rotor body, a relatively thick layer of epoxy is deposited to form the glue line. However, the thicker the glue line the more difficult it is to maintain uniform thickness. Stated another way, the thicker the glue line the stronger the bond, but the less likely it is that the rotor's concentricity will be maintained prior to machining. The obvious solution to the problem is to deposit a relatively thin glue line. But with a thin glue line, the more likely it is for the stainless steel foil to separate from the aluminum rotor body. Faced with the above competing considerations (i.e., thick versus thin glue line), the prior art method of fabricating rotors resulted in extensive trial and error approach.

Still another problem which results from the prior art method is that of low rotor yield (i.e., the ratio of acceptable rotors to rejected ones). The low yield stems from the fact that after the rotor is cooled, it has to be machined to achieve a desired surface contour and concentricity. In machining the rotor if the glue line is not evenly distributed, then in order to maintain the desired concentricity, the stainless steel foil or skin will be unevenly machined. For example, in some cases the stainless steel foil was completely machined through (i.e., chewed away) thereby exposing the epoxy surface.

Finally, the cost of manufacturing a rotor using the prior art method is rather expensive. The expense stems from the fact that a relatively large amount of time is spent in applying the adhesive to the material (i.e., the aluminum rotor body and the stainless steel foil), a large amount of time is spent in baking the material and a large amount of time is spent in cooling the material. With this increased cost, the prior art article and method is not suitable for manufacturing a rotor for a low cost magnetic tape transport.

Although the prior art has been discussed in the preceding paragraph in view of a specific article, it should be noted that the forming of a joint between dissimilar metals or the bonding of dissimilar metals is extremely difficult. In fact, the applicants have no knowledge of prior art wherein dissimilar metals are bonded together in a non-laminate structure.

U.S. Pat. No. 3,566,008 is an example of prior art method of forming a joint between dissimilar metals. In this patent, aluminum is bonded to plated copper. In achieving the bond chamfered holes are punched within the cylindrical copperplated structure. The aluminum structure is then fabricated with tubular portions which are inserted in the chamfered holes. Heat and pressure is then applied to the copper member until the aluminum melts and flows out of the holes thus forming a joint.

Another example of the prior art joining of dissimilar metals to form a laminate structure is disclosed in U.S. Pat. No. 3,458,683. In this patent a metallic foil is sandwiched between two pieces of metallic material. An electron beam is then directed through one of the two retaining metals to thereby form a continuous weldment between steel foil and metal.

SUMMARY OF THE INVENTION

The present invention overcomes the aforementioned drawbacks in the prior art by means of a unique method of bonding stainless steel to aluminum to form a rotor. More specifically, the invention discloses a unique method for using electron beam welding to join two dissimilar metals to form a uniform structure. In one feature of the invention a rotor support body is fabricated from aluminum stock. The rotor support body is substantially circular with adjacent plenum chambers positioned around its periphery. A hole having a diameter within the range of from 0.123 to 0.125 inches is machined through the rotor. The hole is positioned so that its center is approximately 0.056 inches from the rotor circumferential surface. The longitudinal axis of said hole runs parallel with the longitudinal axis of the rotor. A stainless steel pin having a diameter substantially larger than the diameter of the hole is press fitted (hereinafter called press welded) into said hole. The pin is positioned so that its longitudinal axis runs parallel with the longitudinal axis of the rotor. The circumferential surface of the rotor is then machined to expose portions of the stainless steel pin. A length of stainless steel foil is then stretched around the periphery of the aluminum rotor support. The width of the stainless steel foil is substantially equivalent to the width of the rotor. The length of stainless steel foil is such that after stretching it to encircle the aluminum rotor support, the ends meet at the exposed surface of the stainless steel pin thereby forming an endless loop. The ends are then electron beam welded onto the stainless steel pin.

In another feature of the invention a plurality of air holes are positioned on the surface of the stainless steel foil. These holes supply pressurized air from the plenum chambers thereby enabling magnetic media to fly relative to said rotor.

In still another feature of the invention, a head mount carrying magnetic transducer is positioned on the rotor. The magnetic transducer protrudes beyond the surface of the rotor and transduces (read/write) data on a length of magnetic media.

In still another feature of the invention, two stainless steel pins are positioned, one on each side of the magnetic transducer and positioned approximately 60° apart. The pins are inclined approximately 60° with the longitudinal axis of the rotor. The pins are press welded into the body of the rotor with their diametric surface being on the same plane and having the same contour as the surface of the stainless steel foil.

The foregoing and other features and advantages of the invention will be apparent from the following more particular description of the preferred embodiment of the invention, as illustrated in the accompanying drawings.

DETAILED DESCRIPTION

Figure 1:
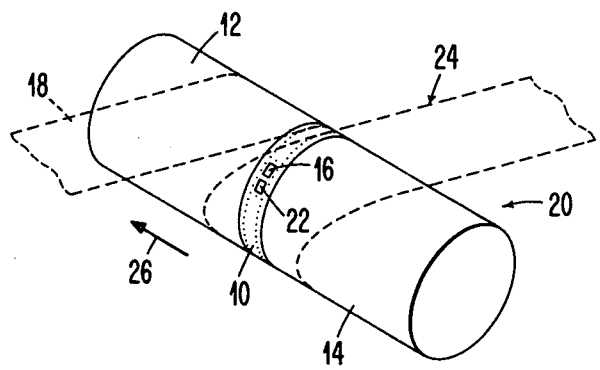
FIG. 1 shows a perspective view of a rotor, manufactured in accordance with the present invention, positioned between two mandrel halves with a length of magnetic media wrapped around said rotor.

In describing the preferred embodiment of the invention, like numerals are used to identify like elements in the drawings.

Referring now to FIG. 1, read/write unit 20 is shown in perspective view. Read/write unit 20 is comprised of left mandrel half 12 and right mandrel half 14. Positioned between and abutting the mandrel halves is rotor 10 which carries read head 16 hereinafter called read magnetic transducer 16 and write head 22, hereinafter called write magnetic transducer 22. A length of magnetic media 18 is helically wrapped around read/write unit 20. Magnetic media 18 is comprised of a plurality of data tracks which are substantially inclined to longitudinal edge 24 of magnetic media 18. In other words, magnetic media 18 is guided in an arcuate path about rotor 10 which rotates on a longitudinal axis (not shown) which runs parallel to the direction shown by arrow 26.

Rotor 10 has holes in its surface for permitting air under pressure to flow through the surface of the rotor to provide an air bearing between the rotor and magnetic media 18. A more detailed description of read/write unit 20 can be found in U.S. Pat. No. 3,840,894 issued on Oct. 8, 1974, to Paul J. Arseneault and assigned to the same assignee of the present invention.

For purposes of the present invention, rotor 10 may not have holes since a hydrodynamic air bearing can be developed between rotor 10 and magnetic media 18 by accelerating rotor 10 at a speed which is relatively higher than the speed at which magnetic media 18 is moving.

Figure 2:
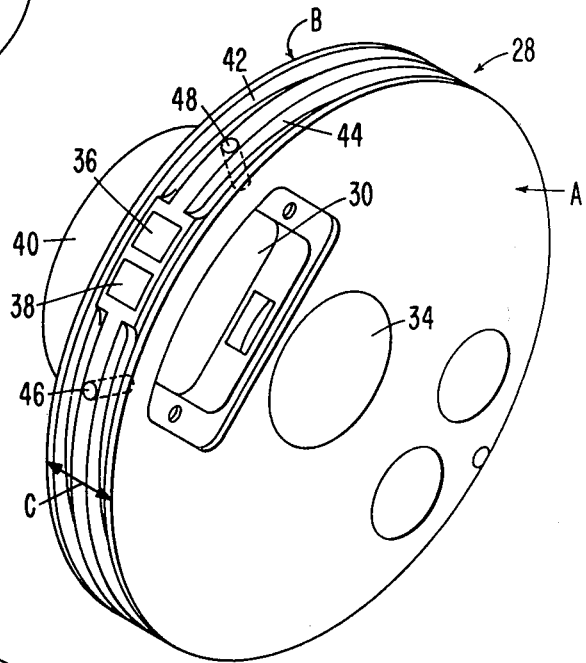
FIG. 2 is a view of the aluminum rotor showing plenum chambers, head access holes and pressed-in stainless steel pins.

Referring now to FIG. 2, rotor support means 28 is shown. Rotor support means 28 is machined from a light weight metal, for example, aluminum. Rotor support means 28 is substantially circular with flat surfaces A (see FIG. 2), surface B (not shown) which is positioned opposite to surface A, and is separated by rotor circumferential surface C. An opening 30 (see FIG. 2) is machined within surface A of rotor support means 28 for accepting a head support block (not shown) which carries read magnetic transducer 16 and write magnetic transducer 22. Of course, any number of magnetic transducers can be positioned on rotor support means 28 without departing from the scope of this invention.

Still referring to FIG. 2, rotor support means 28 comprises hole 34 which passes through its central portion, circumferential surface C and head access holes 36 and 38 positioned on circumferential surface C to receive read magnetic transducer 16 and write magnetic transducer 22.

Still referring to FIG. 2, hub means 40 is positioned on surface B of rotor support means 28. Plenum chambers 42 and 44 are machined around the circumferential surface (i.e., surface C) of rotor support means 28. Air is supplied from a suitable means (not shown) to the plenum chambers. As was described previously, the air in the plenum chambers are used for creating an air bearing between the rotor and magnetic media 18.

As used in this case (see FIG. 2) the rotor longitudinal axis is an imaginary line which passes through the center of hole 34, while the rotor radial axis is any imaginary line which runs in a direction from the rotor longitudinal axis to any point on rotor circumferential surface C (see FIG. 2).

Referring again to FIG. 2, stainless steel pin 46, hereinafter called second fastening means 46 is pressed-in to anchor into the body of rotor support means 28. The term pressed-in as used in this invention means that the lengthwise dimensions of second fastening means 46 is substantially parallel to the radial axis of rotor support means 28. In order to anchor second fastening means 46 into circumferential surface C of rotor support means 28, a hole is first bored with any conventional means. The diameter of the hole is somewhat smaller than the diameter of second fastening means 46. Second fastening means 46 is then forced into the undersize hole by any conventional means. For example, in the preferred embodiment of this invention a hydraulic press was used to force second fastening means 46 into the undersized hole. As used in this disclosure, the entire process of boring a hole and forcing a pin into said hole is called press-welding.

Still referring to FIG. 2, third stainless steel pin 48, hereinafter called third fastening means 48, is press welded into rotor support means 28. The process for anchoring third fastening means 48 is similar to the process described for anchoring second fastening means 46. Second fastening means 46 and third fastening means 48 are anchored in rotor support means 28 so that their diametric surfaces are exposed and coincide with circumferential surface C within the same plane. Second fastening means 46 and third fastening means 48 are positioned on opposite sides of head access holes 36 and 38, respectively, with an approximate 60° separation. Of course, any other orientation may be chosen without departing from the scope of this invention.

Figure 3A:
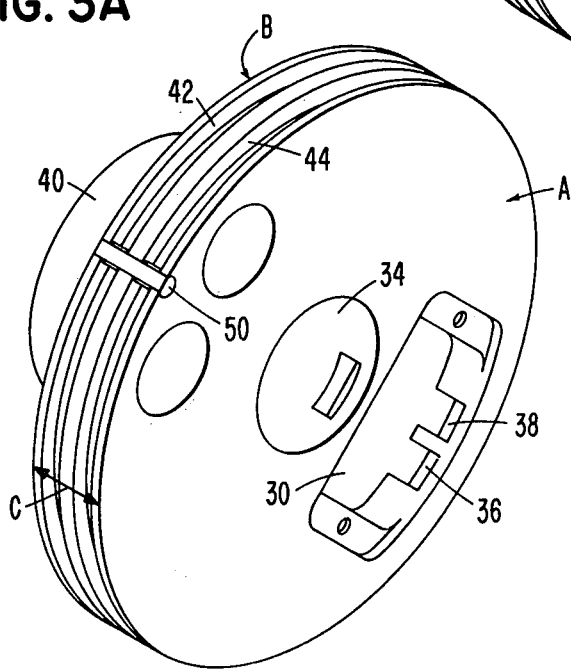
FIG. 3A is a view showing the aluminum rotor body with pressed-through stainless steel pin.
Figure 3B:
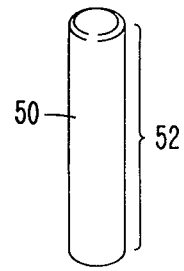
FIG. 3B is a view of the stainless steel pin.

Referring now to FIG. 3A and FIG. 3B, a section of rotor support means 28 is shown with first stainless steel pin 50, hereinafter with first stainless steel pin 50, hereinafter called first fastening means 50. First fastening means 50 is "pressed-through" the body of rotor support means 28 at a point substantially close to the periphery of rotor support means 28 and on the opposite side of a diametrical line drawn between the head axis holes 36 and 38, respectively. The word "pressed-through" as used in this disclosure means that the lengthwise dimension of first fastening means 50 runs in a direction substantially parallel to the direction of the longitudinal axis of rotor support means 28. In order to anchor first fastening means 50, a hole with a diameter somewhat smaller than the diameter of first fastening means 50 is bored in rotor support means 28. Any conventional means for example, a power press, may be used for boring said hole. The longitudinal dimension of said hole is parallel to the longitudinal axis of rotor 28. First fastening means 50 is then press welded into said undersized diameter hole. First fastening means 50 is positioned in the undersized hole so that none of its longitudinal surface 52 is shown. The rotor support means is then machined until portions of first fastening means 50 is exposed along its longitudinal surface 52. In the preferred embodiment of this invention, approximately 0.060 inches are exposed with the exposed surface having the same curvature as rotor support means 28 and having the same height (i.e., on the same level).

As will be explained subsequently (see FIG. 4) stainless steel foil 54 (also called stainless steel skin 54) is stretched around the periphery of rotor support means 28 and is electron beam welded to first fastening means 50 second fastening means 46 and third fastening means 50 to form rotor 10.

Figure 4:
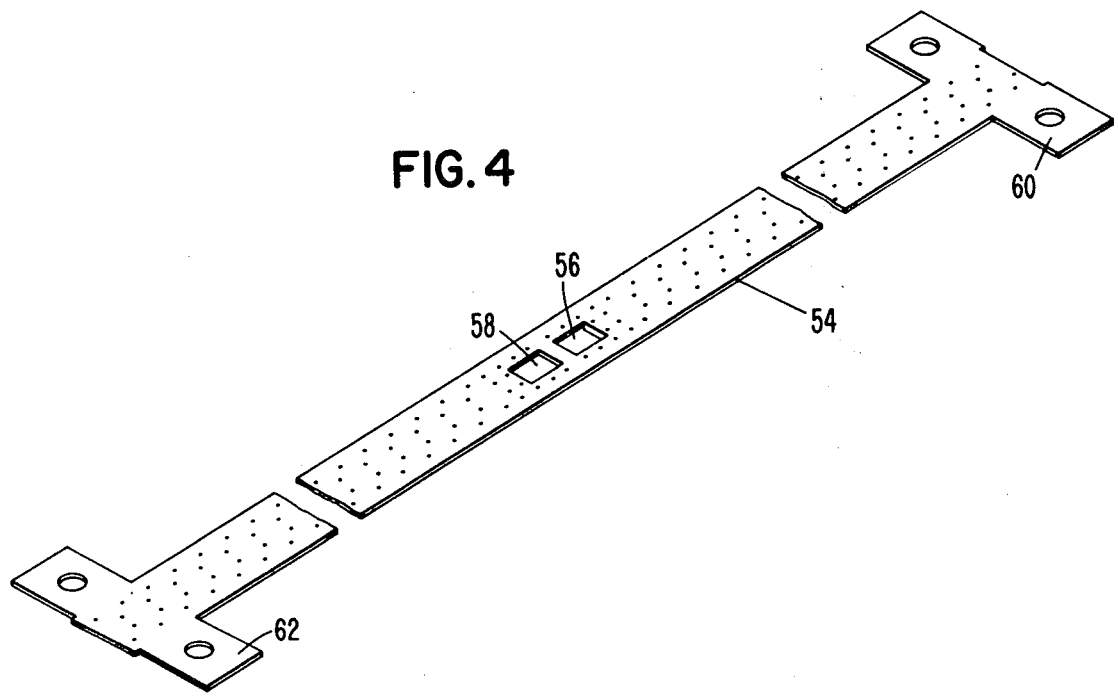
FIG. 4 shows a stainless steel foil strip prior to bonding onto said aluminum rotor.
Figure 5:
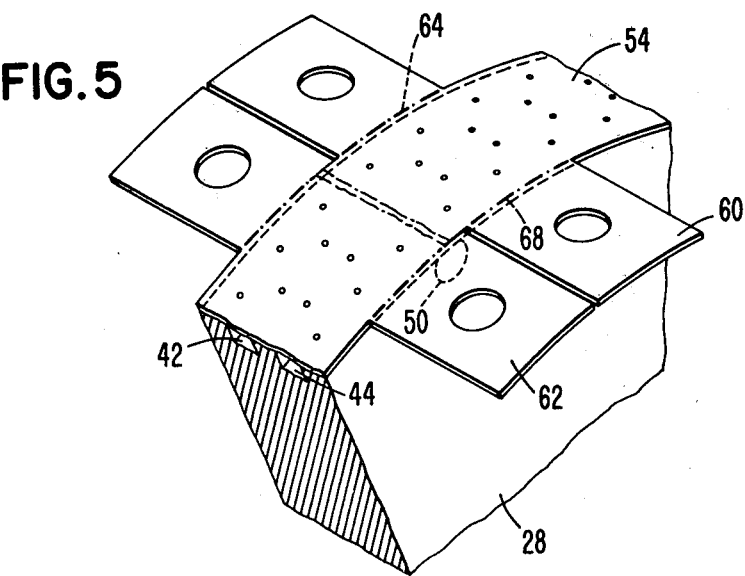
FIG. 5 shows the stainless steel foil electron beam welded onto the pressed-through stainless steel pin.

Still referring to FIG. 4, stainless steel foil 54 is comprised of a strip of foil approximately within the range of from 10.942 inches to 10.945 inches. As explained previously, the plurality of air holes may or may not be machined into the surface. Utility holes 56 and 58 are machined into the surface of stainless steel foil 54. These holes serve as access holes for the magnetic heads when said foil is welded to rotor support means 28 to form rotor 10. Stainless steel foil 54 is manufactured with tabs 60 and 62, respectively. In order to stretch foil 54 around rotor support means 28 to thereby encircle it, conventional tools are attached to tabs 60 and 62. Force is applied to the tools which stretch foil 54 around the periphery of rotor support means 28 until the ends of tabs 60 and 62 meet. The meeting occurs at some point along the exposed surface of first fastening means 50 thereby forming an endless loop. The tabs are then electron beam welded to fastening means 50 (see FIG. 5). The excess amount of tab 60 and tab 62 are removed along broken lines 64 and 68 (see FIG. 5) with conventional cutting tools. In order to enhance the strength of rotor 10, stainless steel foil 54 is electron beam welded to second fastening means 46 and third fastening means 48. This completes the detailed description of the preferred embodiment of the invention.

Operation

In order to manufacture rotor 10, rotor support means 28 is manufactured from aluminum member. Rotor support means 28 is machined from a single aluminum member with hollow hub 10 and a circular section. Plenum chambers 42 and 44, respectively, are machined around the periphery of the circular portion. Head support hole 30 is machined in surface A while head access holes 36 and 38 are machined in circumferential surface C. Second fastening means 46 and third fastening means 48 are press welded in rotor support means 28. Likewise, the first fastening means 50 is pressed through rotor support means 28. Rotor support means 28 is then machined to expose portions of first fastening means 50. Stainless steel foil 54 (having a length of approximately 10.942 inches) is positioned around rotor support means 28 so that utility holes 56 and 58 are aligned with access holes 38 and 36, respectively. Tension is then applied to tabs 60 and 62 until both ends abut on each other on first fastening means 50. The ends are then electron beam welded to first fastening means 50. Also, stainless steel foil 54 is electron beam welded to second fastening means 46 and third fastening means 48. The welding was done with a conventional welding apparatus with the following settings: 50 KV.SMA 38 ipm. The excess portion of tabs 60 and 62 are removed. A head mount for supporting a read and a write magnetic transducer (not shown) is then fitted into support access hole 30. The rotor is then ready for use in a helical device ad depicted in FIG. 1.

While the invention has been particularly shown and described with reference to preferred embodiments thereof, it will be understood by those skilled in the art that various changes in form and details may be made therein without departing from the spirit and scope of the invention.

What is claimed is:

1. A method of bonding a first member to a second member, both members being metallurgically incompatible, said method comprising the steps of:
   anchoring pieces of metals into the body of the first member, said pieces of metal being metallurgically incompatible with said first member;
   placing a second member in contact with said pieces, said second member being metallurgically compatible with said pieces of metals; and
   electron beam welding said second member onto said pieces of metals.

2. A method of bonding two metallurgically incompatible metals to form a unified hermetically sealed structure, said method comprising:
   anchoring pins into the body of a first member, said pins being fabricated from a material metallurgically incompatible with said first member;
   machining the pin and/or first member so that their surface contour is substantially the same;
   placing a second member in contact with said machined surface, said second member being fabricated from a material metallurgically compatible with the anchoring pins; and
   electron beam welding said second member to the anchored pins.

3. The method as claimed in claim 2 wherein the pins are anchored by press welding said pins into the first member.

4. A method of bonding a stainless steel foil to an aluminum member to form a hermatically sealed rotor for a rotating head device comprising the steps of:
   fabricating a substantially circular rotor from aluminum, said rotor having plenum chambers positioned around its periphery;
   press welding stainless steel pins around the periphery of said aluminum rotor;
   stretching a length of stainless steel foil so as to encircle the periphery of said rotor; and
   electron beam welding said stainless steel foil onto the stainless steel pins.

5. The method as claimed in claim 4 wherein the rotor has a diameter within the range of from 3.5030 to 3.5035 inches.

6. The method as claimed in claim 4 wherein the stainless steel foil has a width substantially equivalent to the width of the rotor with a length of within the range of from 10.942 to 10.945 inches and a thickness between the range of from 0.014 to 0.0155 inches.

7. An improved method of fabricating a mechanical joint, for bonding a first member to a second member with both members having metallurigcal incompatible characteristics, comprising the steps of:
   boring a hole within the body of the first member;
   forcing an anchoring means into said hole, said anchoring means having a larger diameter than said hole; and
   electron beam welding said second member onto the anchoring means.

8. An improved mechanical joint which bonds incompatible metals comprising:
   a first member;
   an anchoring means substantially enbedded into said first member with portions of its surface being exposed, said anchoring means being metallurgically incompatible with said first member; and
   a second member being electron beam welded to said first member thereby forming the mechanical joint.

9. A method of bonding a stainless steel member to an aluminum member comprising the following steps:
   anchoring stainless steel pins in the aluminum member; and
   electron beam welding the stainless steel member onto the stainless steel pins.

10. The method as claimed in claim 9 where the anchoring step includes press welding.

11. A method of bonding a stainless steel member to an aluminum member comprising the following steps:
   anchoring aluminum pins in the stainless steel member; and
   electron beam welding the aluminum member to the aluminum pins.

* * * * *

UNITED STATES PATENT AND TRADEMARK OFFICE
CERTIFICATE OF CORRECTION

PATENT NO. : 4,143,259
DATED : March 6, 1979
INVENTOR(S) : C. D. Hurd, R. P. Loomis It is certified that error appears in the above-identified patent and that said Letters Patent are hereby corrected as shown below:

Column 5, line 58, delete     "with first stainless steel pin 50, here-"

Column 5, line 59, delete     "inafter"

Column 6, line 22, delete     "50"
                and insert --48--

Column 7, line 11, delete     "ad"
                and insert --as--

Signed and Sealed this

Twentieth Day of November 1979

[SEAL]

Attest:

RUTH C. MASON
Attesting Officer

LUTRELLE F. PARKER
Acting Commissioner of Patents and Trademarks